H. W. GABBETT-FAIRFAX.
DECORTICATING MACHINE.
APPLICATION FILED FEB. 24, 1912.

1,038,339.

Patented Sept. 10, 1912.

2 SHEETS—SHEET 1.

Witnesses:

Inventor:
Hugh William Gabbett-Fairfax,

By

Attorney.

UNITED STATES PATENT OFFICE.

HUGH WILLIAM GABBETT-FAIRFAX, OF WESTMINSTER, LONDON, ENGLAND.

DECORTICATING-MACHINE.

1,038,339. Specification of Letters Patent. Patented Sept. 10, 1912.

Application filed February 24, 1912. Serial No. 679,693.

*To all whom it may concern:*

Be it known that I, HUGH WILLIAM GABBETT-FAIRFAX, a citizen of the United Kingdom of Great Britain and Ireland, and resident of 78 Palace Chambers, Bridge street, Westminster, London, England, have invented certain new and useful Improvements in Decorticating-Machines, of which the following is a specification, such as will enable others skilled in the art to which it appertains to make and use the same.

This invention relates to machines for the removal of pericarp from nuts and the like and refers to that class of machine in which the nuts are brought into contact with an abrading surface, the main feature of the invention being that centrifugal force is made use of to press the fruit against the said surface and with or without mechanical assistance to move it relatively to the said surface.

Figure 1:
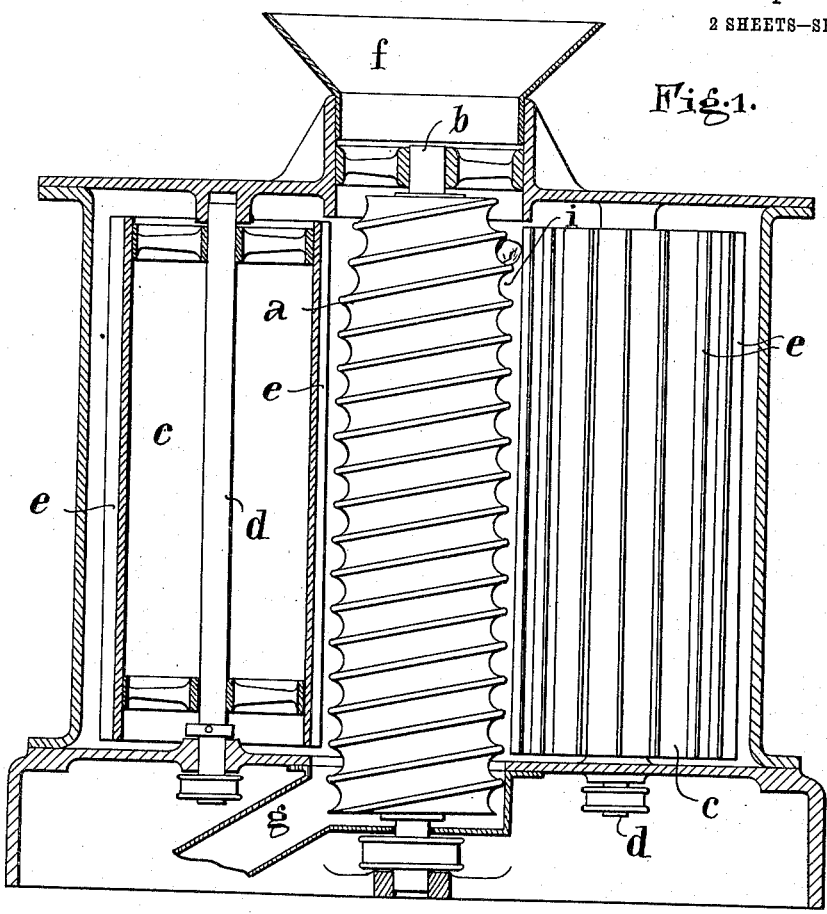
Figure 3:
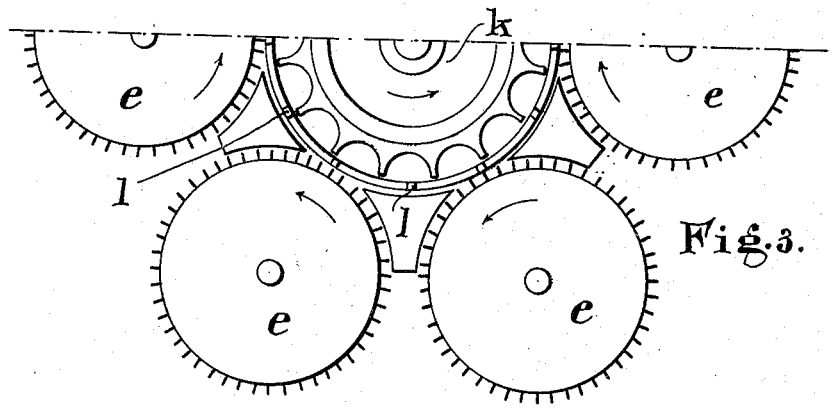
Figure 4:
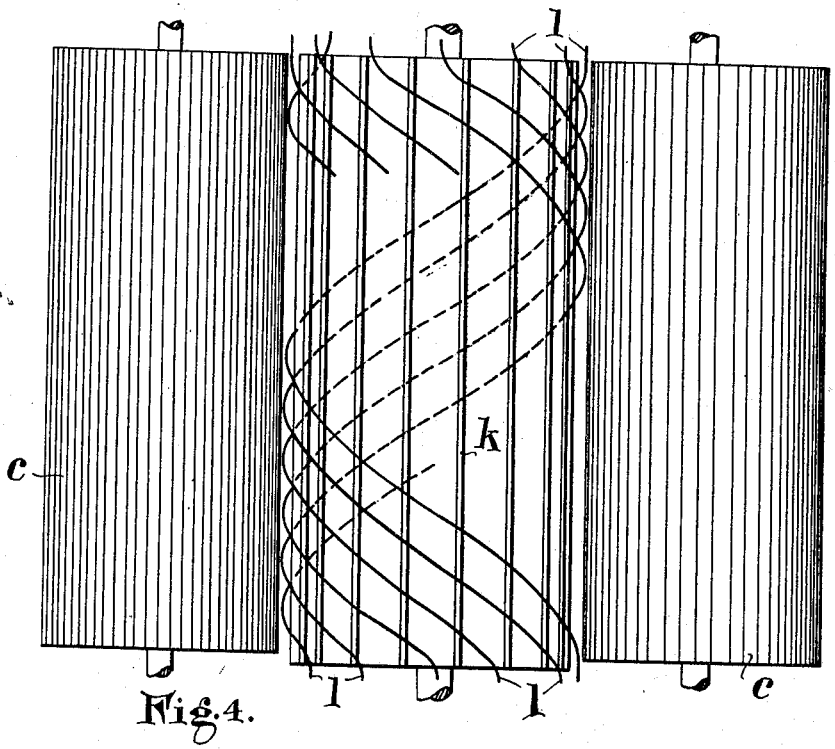

In the accompanying drawings, an example of my invention is shown: Figure 1 being a sectional elevation, and Fig. 2 a sectional plan view. Figs. 3 and 4 show, diagrammatically another form of the invention.

Figure 2:
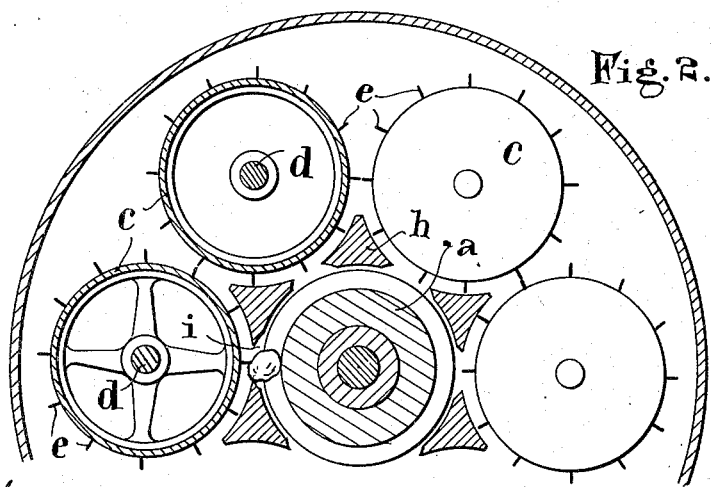

In Figs. 1 and 2 a vertically arranged conveying worm $a$ mounted on spindle $b$ is employed to carry the nuts or other fruit downwardly between a series of rotating abraders on vertical spindles $d$ arranged equidistant from the spindle $b$. The abraders shown each comprises a frame work $c$ on which projecting blades $e$ are fixed. A hopper $f$ is set over the conveyer to receive the nuts which falling on to the conveyer are thrown outwardly and contact with the blades $e$, said nuts being at the same time carried around and down by the conveyer and brought into contact with each of the abraders and finally delivered into the chute $g$. The blades of the abraders carry away the pericarp which falls by gravity and is collected in any convenient manner (not shown) the kernels being prevented from escaping by the filling pieces $h$. The drawings show several nuts in the spaces $i$ between the conveyer and the abraders but it is understood that in use a large number of nuts will be simultaneously passing along the conveyer. Each of the spindles is shown fitted with a pulley but any means for driving may be employed and for high speed suitable bearings would be used.

In Figs. 3 and 4 the abraders $e$ are arranged in substantially the same manner as in Figs. 1 and 2 but instead of employing a rotating conveying worm a fluted drum $k$ is used to throw the nuts outward and fixed spirals of wire, rod or the like $l$ convey the nuts downwardly. Any convenient construction or arrangement of spirals can be used. The nuts may be passed into the machine under any desired pressure and either dry, wet, hot or cold, steam being used if desired.

The invention may be carried out within the scope of the following claims.

What I claim and desire to secure by Letters Patent is:—

1. A machine for removing pericarp from nuts comprising a drum having a groove therein adapted to receive the nuts mounted upon a vertical spindle and adapted to be rotated and a plurality of abrading devices mounted upon vertical spindles and arranged around said drum with a space between the peripheries of the drum and of the abrading devices into which space the nuts are delivered and in which they are freed from their pericarp by the united action of the drum and the abraders.

2. A machine for removing pericarp from nuts comprising a casing, a conveyer operating in said casing, a plurality of abrading members, operating in conjunction with said conveyer, filling members substantially triangular in cross section, vertically supported within said casing, and means for operating said abrading members.

3. A machine for removing pericarp from nuts, comprising a casing, a hopper mounted upon said casing, a vertical conveyer mounted in the casing, a plurality of abrading rolls substantially housing the conveyer, filling members supported in spaced relation around the central conveyer, and means for operating the conveyer and abrading members.

In witness whereof I have hereunto set my hand in presence of two witnesses.

HUGH WILLIAM GABBETT-FAIRFAX.

Witnesses:
J. W. PATCHING,
O. F. MENLY.